US012629769B2

(12) United States Patent
Guo et al.

(10) Patent No.: US 12,629,769 B2
(45) Date of Patent: May 19, 2026

(54) SOLID-PHASE MOLDING PROCESSING METHOD

(71) Applicants:INSTITUTE FOR THE DEVELOPMENT AND QUALITY, MACAU, Macau (CN); AEROSPACE ENGINEERING EQUIPMENT (SUZHOU) CO., LTD., Suzhou (CN)

(72) Inventors: Dawei Guo, Macau (CN); Hu Wang, Suzhou (CN); Waii Lam, Macau (CN); Meng Xu, Suzhou (CN); Zhixiong Zhu, Suzhou (CN); Wenxiao Li, Suzhou (CN); Chitat Kwok, Macau (CN); Lapmou Tam, Macau (CN)

( * ) Notice: Subject to any disclaimer, the term of this patent is extended or adjusted under 35 U.S.C. 154(b) by 0 days.

(21) Appl. No.: 19/018,368

(22) Filed: Jan. 13, 2025

(65) Prior Publication Data

US 2025/0144741 A1 May 8, 2025

Related U.S. Application Data

(63) Continuation of application No. PCT/CN2024/082775, filed on Mar. 20, 2024.

(30) Foreign Application Priority Data

Mar. 22, 2023 (CN) .......................... 202310285925.4

(51) Int. Cl.
B23K 20/12 (2006.01)
B33Y 10/00 (2015.01)
B33Y 30/00 (2015.01)

(52) U.S. Cl.
CPC ...... B23K 20/1245 (2013.01); B23K 20/1225 (2013.01); B33Y 10/00 (2014.12); B33Y 30/00 (2014.12)

(58) Field of Classification Search
CPC ............ B23K 20/1245; B23K 20/1225; B23K 20/1215; B23K 20/1235; B23K 20/1255;
(Continued)

(56) References Cited

U.S. PATENT DOCUMENTS

| 2003/0111515 A1* | 6/2003 | Scheglmann ...... B23K 20/1235 |
| | | 228/2.1 |
| 2006/0065698 A1* | 3/2006 | Ishikawa ............ B23K 20/1265 |
| | | 228/2.1 |

(Continued)

FOREIGN PATENT DOCUMENTS

| CA | 3081330 A1 * | 5/2019 | .............. B22F 12/50 |
| CN | 1167663 A * | 12/1997 | ......... B23K 20/1255 |

(Continued)

*Primary Examiner* — Kiley S Stoner

(57) ABSTRACT

The present application discloses a solid-phase molding processing method, which includes: heating the heating ring to generate heat in the heating ring; the heat generated by the heating ring is conducted downwardly through the stir body to a shaft shoulder and/or a welding pin of the tool head; driving the stir friction tool to rotate to deform the to-be-processed workpiece to generate friction heat; converging the friction heat with the heat conducted to the tool head to heat and soften the to-be-processed workpiece, to form a plastic deformation flow; and translating the stir friction tool, to make the plastic deformation flow deposited behind the tool head to form a molding portion.

11 Claims, 10 Drawing Sheets

(58) Field of Classification Search
CPC ...... B23K 20/128; B23K 20/12; B23K 20/24; B23K 20/122–1295; B33Y 10/00; B33Y 30/00
USPC ............................. 228/112.1–114.5, 2.1–2.3
See application file for complete search history.

(56) References Cited

U.S. PATENT DOCUMENTS

| | | | | |
|---|---|---|---|---|
| 2007/0228104 A1* | 10/2007 | Mankus | ............... | B23K 20/125 228/101 |
| 2012/0298304 A1* | 11/2012 | Kato | .................. | B23K 20/1235 228/2.1 |
| 2016/0175981 A1* | 6/2016 | Kandasamy | ....... | B23K 20/1295 228/114.5 |
| 2016/0221117 A1* | 8/2016 | Taniguchi | ................ | C21D 9/50 |
| 2016/0228981 A1* | 8/2016 | Matsushita | ........ | B23K 20/1235 |
| 2017/0312850 A1* | 11/2017 | Werz | .................. | B23K 20/1255 |
| 2018/0281104 A1* | 10/2018 | Odakura | ............... | C21D 9/505 |
| 2019/0126385 A1* | 5/2019 | Odakura | ............... | B23Q 11/14 |
| 2021/0402509 A1* | 12/2021 | Fleck | .................. | B23K 20/122 |
| 2024/0399492 A1* | 12/2024 | Fleck | .................. | B23K 20/123 |
| 2025/0144739 A1* | 5/2025 | Guo | .................. | B23K 20/1255 |
| 2025/0144741 A1* | 5/2025 | Guo | .................. | B23K 20/1225 |
| 2026/0001160 A1* | 1/2026 | Leitner | ............. | B23K 20/1245 |

FOREIGN PATENT DOCUMENTS

| | | | | | |
|---|---|---|---|---|---|
| CN | 103639587 | A | * | 3/2014 | ........... B23K 37/003 |
| CN | 105108298 | A | * | 12/2015 | ............. B23K 20/26 |
| CN | 105108316 | A | * | 12/2015 | ............. B23K 20/26 |
| CN | 105562954 | A | | 5/2016 | |
| CN | 105834577 | A | * | 8/2016 | ............. B23K 20/26 |
| CN | 105904083 | A | * | 8/2016 | ........ B23K 20/1255 |
| CN | 105921878 | A | * | 9/2016 | .......... B23K 20/123 |
| CN | 106141417 | A | * | 11/2016 | ............. B23K 20/14 |
| CN | 106141418 | A | * | 11/2016 | .......... B23K 20/123 |
| CN | 106141419 | A | * | 11/2016 | .......... B23K 20/123 |
| CN | 106141420 | A | * | 11/2016 | ........ B23K 20/1245 |
| CN | 106181017 | A | * | 12/2016 | ............. B23K 20/12 |
| CN | 106181019 | A | * | 12/2016 | .......... B23K 20/123 |
| CN | 106238899 | A | * | 12/2016 | ........ B23K 20/1245 |
| CN | 106238900 | A | * | 12/2016 | .......... B23K 20/123 |
| CN | 106271024 | A | * | 1/2017 | .......... B23K 20/123 |
| CN | 106583917 | A | * | 4/2017 | ........ B23K 20/1245 |
| CN | 106735856 | A | * | 5/2017 | ............. B23K 20/26 |
| CN | 106808083 | A | * | 6/2017 | ........ B23K 20/1245 |
| CN | 107030371 | A | * | 8/2017 | .......... B23K 20/125 |
| CN | 107378228 | A | * | 11/2017 | ............. B23K 20/22 |
| CN | 107876963 | A | * | 4/2018 | .......... B23K 20/126 |
| CN | 108213690 | A | * | 6/2018 | ............. B23K 20/24 |
| CN | 109202262 | A | * | 1/2019 | .......... B23K 20/122 |
| CN | 109261962 | A | * | 1/2019 | ............. B22F 3/105 |
| CN | 109317815 | A | * | 2/2019 | ........ B23K 20/1235 |
| CN | 110076445 | A | * | 8/2019 | ........ B23K 20/1245 |
| CN | 110102871 | A | * | 8/2019 | ............. B23K 20/26 |
| CN | 110102873 | A | * | 8/2019 | .......... B23K 37/003 |
| CN | 111069762 | A | * | 4/2020 | ............. B23K 20/26 |
| CN | 111069763 | A | * | 4/2020 | ............. B23K 20/26 |
| CN | 107309541 | B | * | 6/2020 | ........ B23K 20/1245 |
| CN | 112122768 | A | * | 12/2020 | .......... B23K 20/122 |
| CN | 112247337 | A | * | 1/2021 | ........ B23K 20/1255 |
| CN | 112355464 | A | * | 2/2021 | ............. B23K 20/26 |
| CN | 113118612 | A | * | 7/2021 | ............. B33Y 30/00 |
| CN | 113927152 | A | * | 1/2022 | ........ B23K 20/1245 |
| CN | 113953645 | A | * | 1/2022 | ........ B23K 20/1255 |
| CN | 113953646 | A | * | 1/2022 | ........ B23K 20/1255 |
| CN | 113953650 | A | * | 1/2022 | ........ B23K 20/1245 |
| CN | 113953651 | A | * | 1/2022 | ........ B23K 20/1255 |
| CN | 114083107 | A | * | 2/2022 | ............. B25B 27/00 |
| CN | 114247982 | A | * | 3/2022 | ........ B23K 20/1255 |
| CN | 115122042 | A | * | 9/2022 | ............. B23K 20/26 |
| CN | 115555700 | A | * | 1/2023 | ........ B23K 20/1245 |
| CN | 116140783 | A | * | 5/2023 | .......... B23K 20/122 |
| CN | 116423033 | A | * | 7/2023 | ........ B23K 20/1245 |
| CN | 116765397 | A | * | 9/2023 | ............. B22F 5/00 |
| CN | 117340414 | A | * | 1/2024 | .......... B23K 20/122 |
| CN | 117340419 | A | * | 1/2024 | ........ B23K 20/1215 |
| CN | 117564439 | A | * | 2/2024 | ............. B23K 20/12 |
| CN | 117564443 | A | * | 2/2024 | ............. B23K 20/26 |
| CN | 118204619 | A | * | 6/2024 | ........ B23K 20/1245 |
| CN | 118237606 | A | * | 6/2024 | ............. B33Y 30/00 |
| CN | 118848202 | A | * | 10/2024 | ............. B33Y 10/00 |
| DE | 102012001778 | A1 | | 8/2013 | |
| EP | 810055 | A1 | * | 12/1997 | |
| EP | 1640103 | A1 | * | 3/2006 | ........ B23K 20/1235 |
| JP | 2002263865 | A | | 9/2002 | |
| JP | 2007130646 | A | * | 5/2007 | ........ B23K 20/1245 |
| JP | 6143915 | B1 | * | 6/2017 | ........ B23K 20/1235 |
| JP | 6231236 | B1 | * | 11/2017 | .......... B23K 20/122 |
| KR | 20110075774 | A | * | 7/2011 | ........ B23K 20/1205 |
| KR | 20110116786 | A | * | 10/2011 | .......... B23K 35/302 |
| KR | 20120055035 | A | * | 5/2012 | ............. B23K 20/14 |
| KR | 101331735 | B1 | * | 11/2013 | .......... B23K 35/302 |
| KR | 20200046465 | A | * | 5/2020 | ........ B23K 20/2336 |
| TW | 202408704 | A | * | 3/2024 | ............. C22C 38/00 |
| WO | WO-2014118280 | A1 | * | 8/2014 | ........ B23K 20/1235 |
| WO | WO-2020036249 | A1 | * | 2/2020 | ............. B23K 28/02 |
| WO | WO-2024241659 | A1 | * | 11/2024 | ............. B23K 20/12 |

* cited by examiner

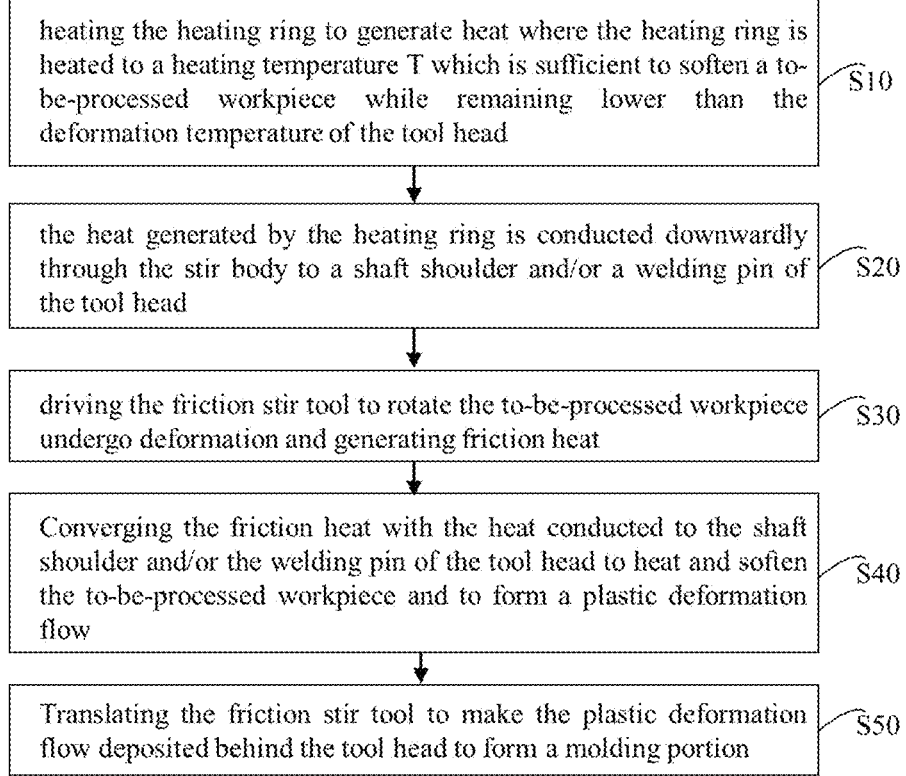

heating the heating ring to generate heat where the heating ring is heated to a heating temperature T which is sufficient to soften a to-be-processed workpiece while remaining lower than the deformation temperature of the tool head ⟋S10 the heat generated by the heating ring is conducted downwardly through the stir body to a shaft shoulder and/or a welding pin of the tool head ⟋S20 driving the friction stir tool to rotate the to-be-processed workpiece undergo deformation and generating friction heat ⟋S30

Converging the friction heat with the heat conducted to the shaft shoulder and/or the welding pin of the tool head to heat and soften the to-be-processed workpiece and to form a plastic deformation flow ⟋S40

Translating the friction stir tool to make the plastic deformation flow deposited behind the tool head to form a molding portion ⟋S50

FIG. 1

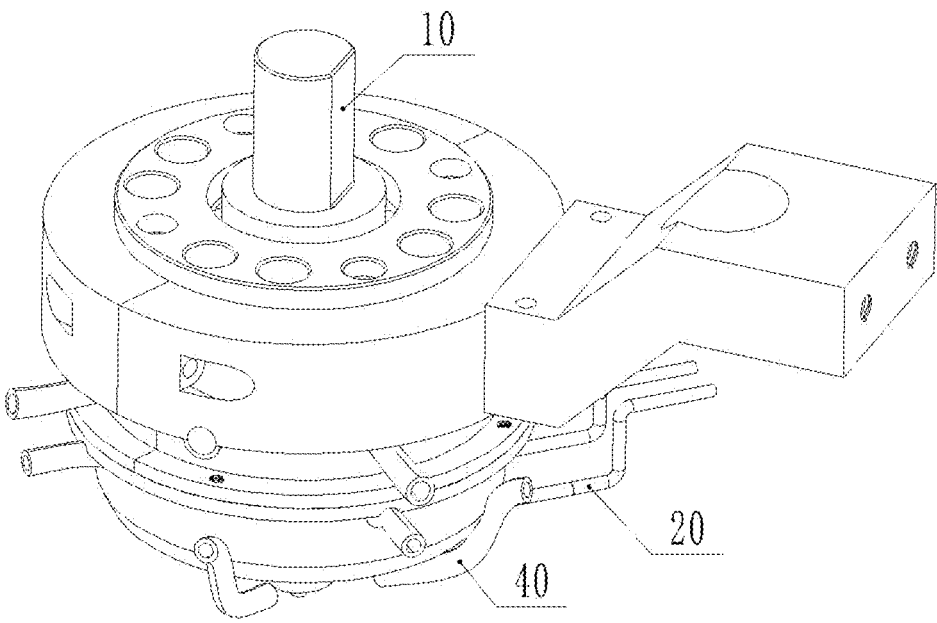

FIG. 2

SOLID-PHASE MOLDING PROCESSING METHOD

CROSS-REFERENCE TO RELATED APPLICATIONS

The present application claims to be related to Chinese Patent Application No. 2023102859254, filed on Mar. 22, 2023, the entire disclosure of which is incorporated herein by reference.

TECHNICAL FIELD

The present application relates to the technical field of solid-phase molding, and particularly to a solid-phase molding processing method.

BACKGROUND

The solid-phase molding technology includes friction stir welding technology and solid-state additive manufacturing. Notably, friction stir welding technology has small welding deformation and residual stress, does not require shielding gas and filler material, can eliminate welding defects such as porosity, inclusions and cracks, and does not produce arc light, smoke, noise pollution, etc. Also, it can significantly reduce the cost, save materials and optimize the structure, etc. which attract the attention of scientific research institutions worldwide. The friction stir welding process generates a large amount of heat through friction between the tool head and the surface of the workpiece, the workpiece is softened rapidly and form a plastic deformation flow.

Typically, the friction stir tool is mounted on the spindle of the friction stir machine and is driven to rotate and move by the machine to achieve friction stir welding, friction stir based additive manufacturing and other work.

Since friction stir welding utilizes friction heat and plastic deformation heat as the welding heat source, when welding materials with excellent high-temperature properties such as high-temperature alloys, the following defects may exist:

Due to insufficient heat, it is necessary to drill holes at the starting position of the workpiece before welding, which is cumbersome and affects the welding efficiency. During friction stir welding, the insufficient heat input can easily cause the fracture of the tool head due to the excessive force, which also result in large residual stress and affect the performance in the welding zone; In addition, in order to achieve the severe friction heat between the tool head and the workpiece, a large downward pressure needs to be exerted on the tool head, making it difficult to apply friction stir welding to high-temperature alloy products with cavity structure.

SUMMARY

The present application provides a solid-phase molding processing method which at least solves the problem in the related art.

In order to achieve the above purpose, the technical solution of the present application is implemented as follows.

There is provided a solid-phase molding processing method adopted with a friction stir tool, where a lower end of the friction stir tool has a tool head, the tool head comprises a stir body and a heating ring provided on the stir body, the solid-phase molding processing method includes:

heating the heating ring to generate heat, where the heating ring is heated to a heating temperature T sufficient to soften a to-be-processed workpiece while remaining lower than the deformation temperature of the tool head;

the heat generated by the heating ring is conducted downwardly through the stir body to a shaft shoulder and/or a welding pin of the tool head;

driving the friction stir tool to rotate, causing the to-be-processed workpiece undergo deformation and generating friction heat;

converging the friction heat with the heat conducted to the shaft shoulder and/or the welding pin of the tool head to heat and soften the to-be-processed workpiece and to form a plastic deformation flow; and translating the friction stir tool to make the plastic deformation flow deposited behind the tool head to form a molding portion.

Optionally, the heating ring is made of high-temperature alloy or a high melting point composite material, and the stir body is made of polycrystalline cubic boron nitride (PCBN) material or ceramic powder material.

Optionally, the heating ring is heated by an induction heater, where it includes a heating portion in a spiral shape surrounding an outside of the heating ring.

Optionally, the solid-phase molding processing method further includes:

preventing the heat generated by the tool head from conducting upwards; and cooling the middle part of the friction stir tool to prevent the heat generated by the tool head from conducting upwards.

Optionally, a peripheral wall of the friction stir tool is provided with a heat dissipation groove, the heat dissipation groove is located above the tool head. The specific method for preventing the heat generated by the tool head from conducting upwards includes:

spraying coolant into the heat dissipation groove of the friction stir tool.

Optionally, the solid-phase molding processing method further includes:

obtaining a real-time temperature of the friction stir tool;

adjusting the heating temperature of the heating ring and/or adjusting a flow rate of the coolant injected into the heat dissipation groove based on the real-time temperature of the friction stir tool;

when the real-time temperature of the friction stir tool is greater than the pre-set value, reduce the heating temperature of the heating ring and/or increase a flow rate of the coolant; and when the real-time temperature of the friction stir tool is less than the pre-set value, increase the heating temperature of the heating ring and/or reduce the flow rate of the coolant.

Optionally, a sleeve is provided on the outside of the friction stir tool, and a cavity corresponding to the heat dissipation groove is provided in the sleeve. The solid-phase processing method further includes:

collecting the coolant thrown out of the heat dissipation groove into the cavity.

Optionally, the solid-phase molding processing method further includes:

expelling water vapor generated during the cooling of the friction stir tool out of the cavity.

Optionally, an exhaust gap connected to the cavity is formed between the sleeve and the friction stir tool, and an exhaust channel connected to the exhaust gap is provided in a side wall of the sleeve, and the water vapor passes through the exhaust gap and then discharged through the exhaust channel.

Optionally, the friction stir tool is provided with water-blocking rings located at the upper end and a lower end of the cavity to prevent the coolant thrown out of the heat dissipation groove from leaking out of the exhaust gap.

Optionally, the sleeve is provided with an exhaust device extending into the cavity, the solid-phase processing method further includes:

discharging the coolant collected in the cavity using the exhaust device.

Optionally, the solid-phase molding processing method is applied to a friction stir welding technology, the specific method of driving the friction stir tool to rotate to deform the to-be-processed workpiece to generate friction heat includes:

driving the friction stir tool to rotate and plunge the tool head down to the weld joint of the to-be-processed workpiece; and rotating the tool head relative to the to-be-processed workpiece to deform the workpiece and to generate the friction heat.

Optionally, the solid-phase molding processing method is applied to a solid-state additive manufacturing, the friction stir tool has a consumable rod channel inside, and the consumable rod channel passes through two ends of the friction stir tool.

The present application has the beneficial effect of,

The heating ring is heated, so that the stir body itself can generate heat. When applied to solid-state additive manufacturing, the heat generated by the stir body can be conducted to the consumable rod inside it to heat the consumable rod to make it soften rapidly so as to improve the efficiency. In the application of friction stir welding technology, the heat generated by the stir body can be conducted down to the tip of the shaft shoulder and the welding pin, and then arrive at the welding of to-be-processed workpiece, to make the welding material softened by heat, so that it is easy for the stir body to extend into the joints of to-be-processed workpiece, to avoid the tedious step of drilling a hole in the starting position of the to-be-processed workpiece in advance, the work intensity of the staff is reduced.

At the same time, the heat generated by the stir body during operation can be converged with the friction heat produced by deformation of the to-be-processed workpiece, to rapidly soften material at the welding part to form a plastic deformation flow, and as the tool head moves forward, the plastic deformation flow is gradually deposited in the back of the welding pin to form a weld joint, which not only improves the welding efficiency, but also enables the tool head to maintain a high temperature state during operation, avoiding fracture of the tool head due to insufficient heat input.

In addition, an increase of the welding temperature also helps to promote dynamic recrystallization, so that the grain grows to release the residual stress of the welding, so as to achieve the improvement of welding properties. Also increasing the heat input reduce the downward pressure on the to-be-processed workpiece, thereby achieving the friction stir welding of single-sided welding to weld products with a cavity structure.

BRIEF DESCRIPTION OF THE DRAWINGS

In order to more clearly illustrate the technical solutions in the embodiments or related art of the present application, the accompanying drawings to be used in the description of the embodiments or related art will be briefly introduced below, and it will be obvious that the accompanying drawings in the following description are only some of the embodiments of the present application, and that other drawings can be obtained according to these drawings by those skilled in the art without creative labor.

FIG. 1 is a flowchart of the solid-phase molding processing method of the present application.

FIG. 2 is a schematic structural diagram of a friction stir tool of an embodiment of the present application.

DETAILED DESCRIPTION OF THE EMBODIMENTS

Figure 3:
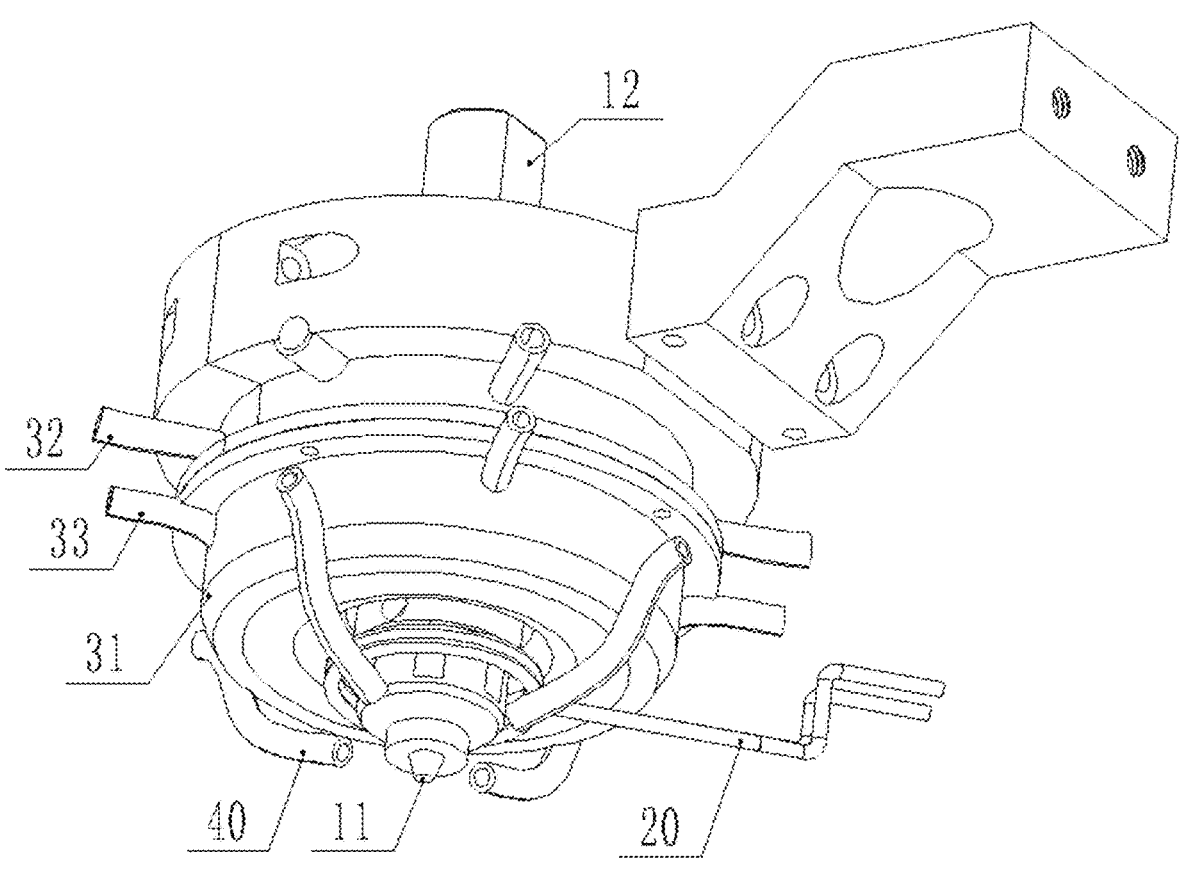
FIG. 3 is a schematic structural diagram of another angle of a friction stir tool of an embodiment of the present application.
Figure 4:
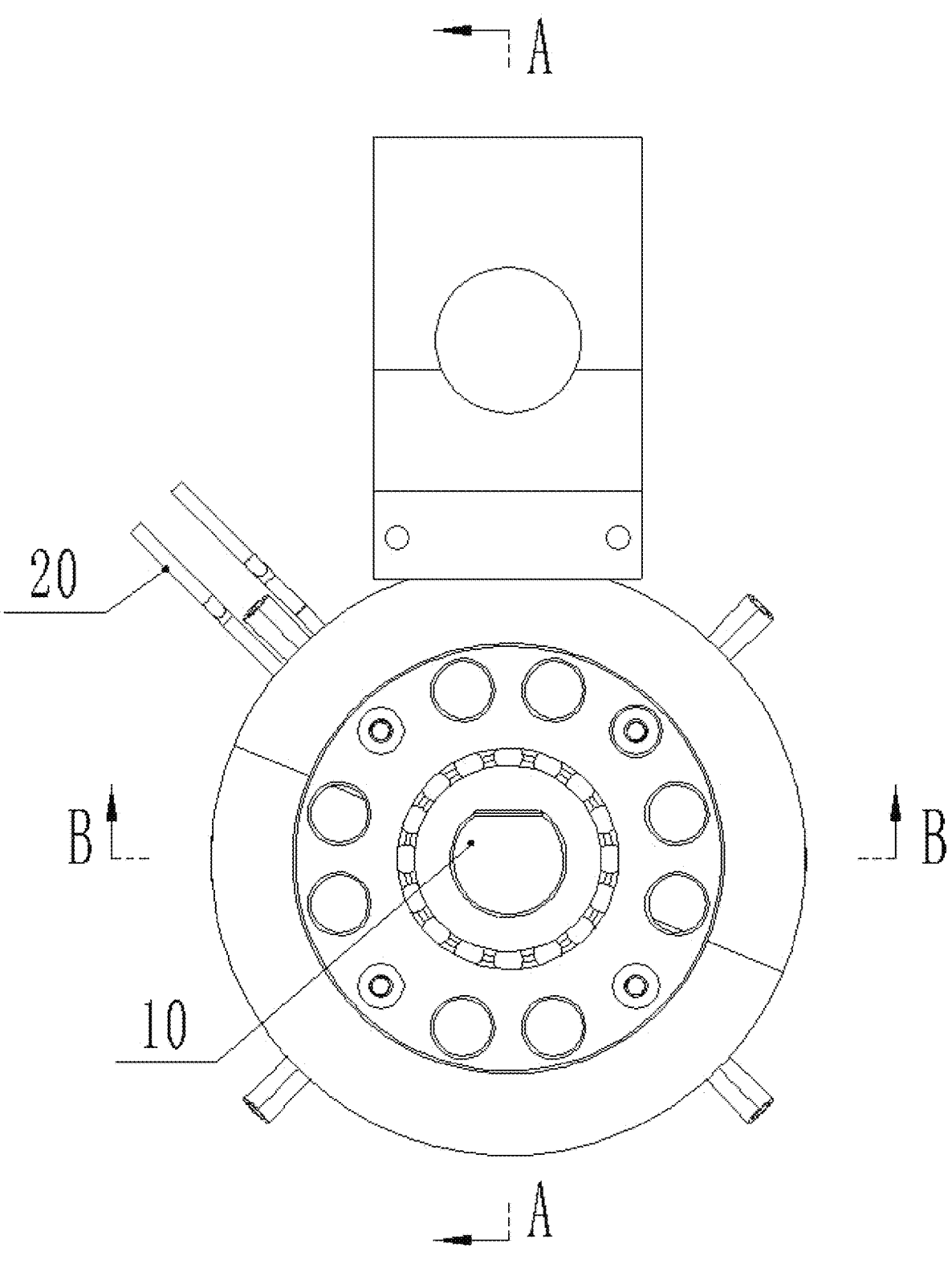
FIG. 4 is a top view of a friction stir tool of an embodiment of the present application.
Figure 5:
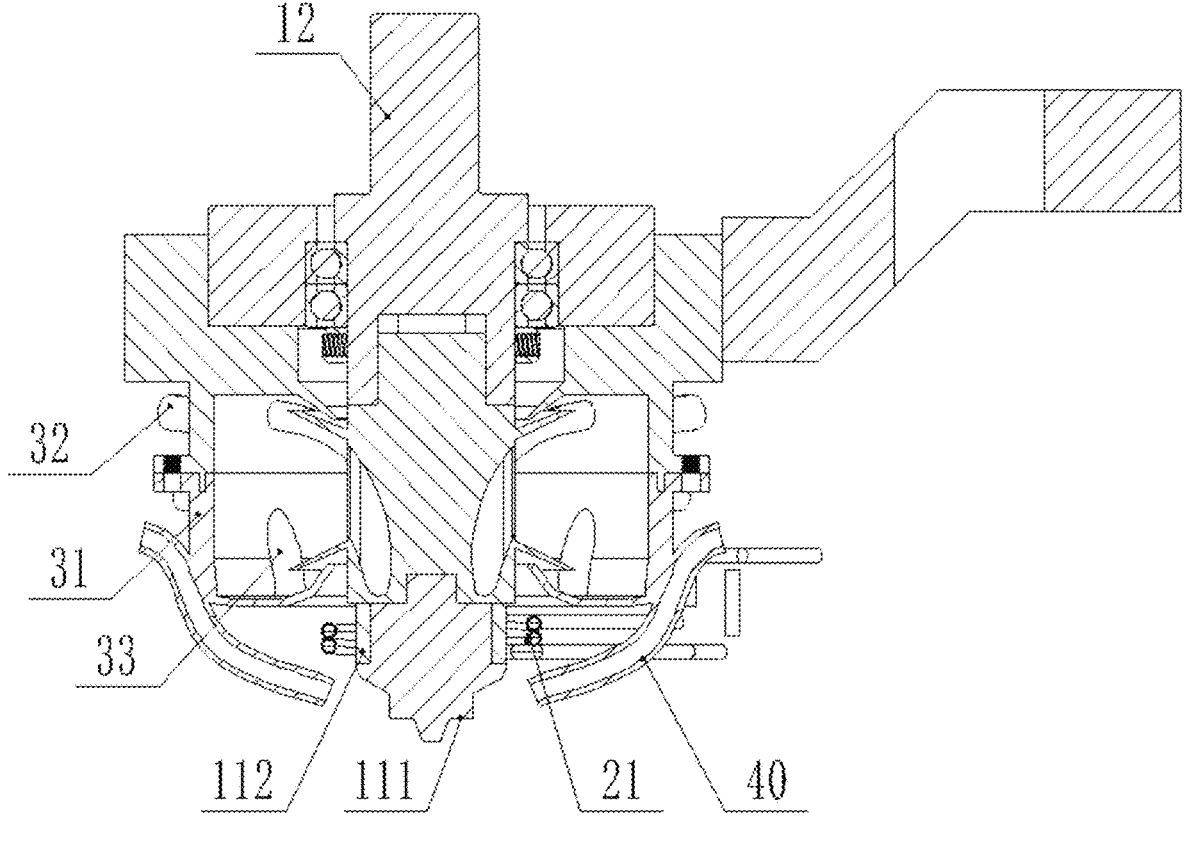
FIG. 5 is a cross-sectional view of portion A-A in FIG. 4.
Figure 6:
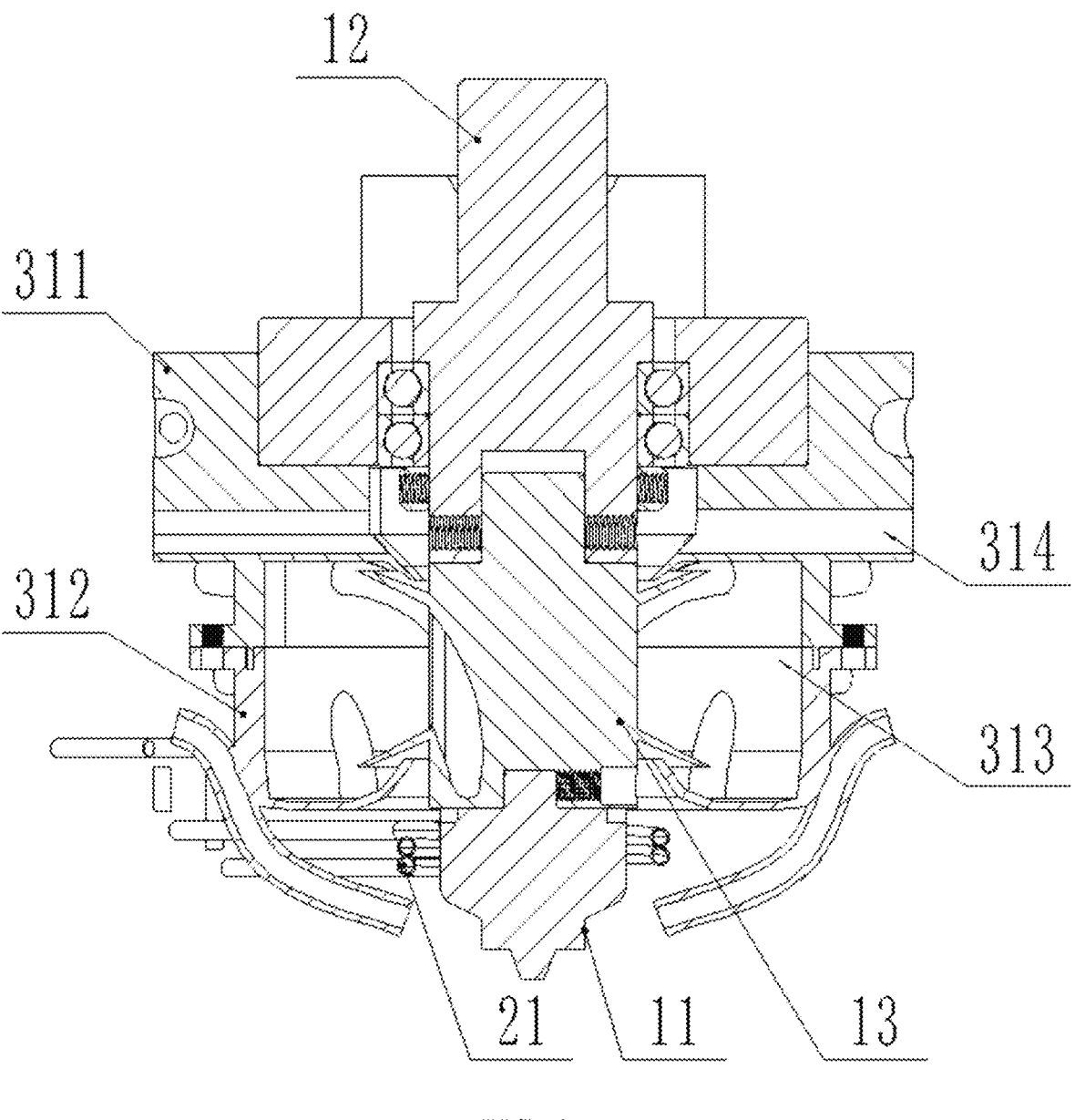
FIG. 6 is a cross-sectional view of portion B-B in FIG. 4.

Embodiments of the present application are described in detail below, and examples of the embodiments are shown in the accompanying drawings, the same or similar labeling throughout denotes the same or similar elements or elements having the same or similar function. The embodiments described below by reference to the accompanying drawings are exemplary and are intended solely for the purpose of explaining the present application and are not to be construed as a limitation of the present application.

In the description of the present application, it is to be understood that the terms "center", "longitudinal", "lateral", "length", "width", "thickness", "top", "bottom", "front", "back", "left", "right", "vertical", "horizontal", "top", "bottom", "inside", "outer", "clockwise", "counterclockwise", "axial", "radial", "circumferential", etc. indicate orientation or positional relationships based on those shown in the accompanying drawings, and are intended only to facilitate description of the present application and to simplify the description, and are not intended to indicate or imply that the device or element referred to must have a particular orientation, be constructed and operated in a particular orientation, and therefore cannot be construed as a limitation of the present application.

Furthermore, the terms "first" and "second" are used for descriptive purposes only and are not to be understood as indicating or implying relative importance or implicitly specifying the number of technical features indicated. Thus, a feature defined with the terms "first", "second" may expressly or implicitly include one or more such features. In the description of the present application, "more than one" means two or more, unless otherwise expressly and specifically limited.

In the present application, unless otherwise expressly specified and limited, the terms "mounted", "connected", "coupled", "fixed", etc. shall be used broadly. The terms "mounted", "connected", "coupled", "fixed", etc. are to be understood in a broad sense, for example, it can be a fixed connection, a removable connection, or a one-piece connection; it can be a mechanical connection or an electrical connection; it can be a direct connection or an indirect connection through an intermediate medium, and it can be a connectivity within the two elements or an interactive relationship between the two elements. For those skilled in the art, the specific meanings of the above terms in the present application may be understood on a case-by-case basis.

In the present application, unless otherwise expressly provided and limited, the first feature being "on" or "under" the second feature may be a direct contact between the first and second features, or an indirect contact between the first and second features through an intermediate medium. Furthermore, the first feature being "over", "above" and "on" the second feature may be that the first feature is directly above or diagonally above the second feature, or simply that the first feature is horizontally higher than the second feature. The first feature being "below", "under" and "underneath" the second feature may be that the first feature is directly below or diagonally below the second feature, or may simply mean that the first feature is less horizontal than the second feature.

The present application will be further described below in connection with the accompanying drawings.

An embodiment of the present application provides a solid-phase molding processing method, the solid-phase molding processing method adopts a friction stir tool 10, a lower end of the friction stir tool 10 has a tool head 11, the tool head 11 includes a stir body 111 and a heating ring 112 provided on the stir body 111, and the solid-phase molding processing method includes:

Step S10, heating the heating ring 112 to generate heat where the heating ring 112 is heated to a heating temperature T which sufficient to soften a to-be-processed workpiece 50 while remaining lower than the deformation temperature of the tool head 11;

Step S20, the heat generated by the heating ring 112 is conducted downwardly through the stir body 111 to a shaft shoulder and/or a welding pin of the tool head 11;

Step S30, drive the friction stir tool 10 to rotate causing the to-be-processed workpiece 50 undergo deformation and generate friction heat;

Step S40, converging the friction heat with the heat conducted to the shaft shoulder and/or the welding pin of the tool head 11 to heat and soften the to-be-processed workpiece 50 and to form a plastic deformation flow; and Step S50, translating the friction stir tool 10, to make the plastic deformation flow deposited behind the tool head 11 to form a molding portion.

The solid-phase molding processing method of the present application can be applied to friction stir welding technology or solid-state additive manufacturing.

When applied to the friction stir welding technology, the friction stir tool 10 may be connected to an external friction stir welding machine, and the friction stir tool 10 is driven by the machine to rotate the friction stir tool 10, in order to deform the to-be-processed workpiece 50 to generate friction heat. Specifically, the friction stir welding includes driving the friction stir tool 10 to rotate and plunge the tool head 11 down to the weld joint of the to-be-processed workpiece 50; rotating the tool head 11 relative to the workpiece 50 to deform the to-be-processed workpiece 50 to generate friction heat.

In the present application, the heating ring 112 is heated before welding, so that the stir body 111 itself generates heat, and the heat is conducted downwardly through the stir body 111 to the shaft shoulder of the tip and the welding pin thereof, and then arrives at the weld of the to-be-processed workpiece 50, so that the material at the weld is softened by the heat, and it is convenient for the stir body 111 to reach into the joints of the to-be-processed workpiece 50, to avoid the tedious step of drilling a hole in the starting position of the to-be-processed workpiece 50 in advance, the work intensity of the staff is reduced.

The heat generated by the stir body 111 during the operation can be converged with the friction heat generated by the deformation of the to-be-processed workpiece 50, so as to soften the material in the welding part to form a plastic deformation flow, and as the tool head 11 moves forward, the plastic deformation flow is gradually deposited behind the welding pin to form a weld joint, which not only improves the welding efficiency, but also enables the tool head 11 to maintain a high temperature state during operation, avoiding fracture of the tool head 11 easily caused by insufficient heat input.

In addition, an increase of the welding temperature also helps to promote dynamic recrystallization, so that the grain grows to release the residual stress of the welding, so as to achieve the improvement of welding properties. Also increasing the heat input reduce the downward pressure on the to-be-processed workpiece 50, thereby achieving the friction stir welding of single-sided welding to weld products with a cavity structure.

When applied to solid-state additive manufacturing, the friction stir tool 10 is provided with a consumable rod channel 113 inside, the consumable rod channel 113 runs through both ends of the friction stir tool 10. The consumable rod channel 113 is used to hold a consumable rod, and a bottom end of the consumable rod extends downwardly to the outside of the tool head 11 to contact the substrate and rotate relative to the substrate driven by the friction stir tool 10 to produce a plastic deformation flow to coat the surface of the substrate.

In the present application, the heating ring 112 is heated, so that the tool head 11 generates heat, which is transmitted to the consumable bar inside the stir friction tool 10, causing the consumable bar to soften rapidly, while the stir friction tool 10 drives the consumable bar to rotate and presses consumable bar down, so that the consumable bar is in contact with the substrate, and heat generated by friction on the contact surface and the heat transmitted by the tool head 11 make a great plastic deformation on the consumable bar, and as the tool head 11 moves forward, the consumable bar on which the plastic deformation is performed is coated on the surface of the substrate, so as to form a coating, which effectively improves the efficiency of the material additive.

In some embodiments of the present application, the heating ring 112 may be set on the upper end of the stir body 111 away from the shaft shoulder and the welding pin, and is set in a split structure with the stir body 111. The stir body 111 may be manufactured from PCBN material or ceramic powder material, such as polycrystalline diamond powder, boron carbide powder, etc., while the heating ring 112 may be manufactured from high-temperature alloy material or high melting point composite material, such as tungsten rhenium alloy, pure tungsten, etc. In this way, since PCBN material has good red heat, poor electrical conductivity but good thermal conductivity, and tungsten has a high melting point (its melting point of up to 3410 degC), and can be heated by inductance characteristics, when the heating ring 112 is heated, the heat generated by the stir body 111 is conducted downwardly to the shaft shoulder and the welding pin, and then arrived at the machining region of to-be-processed workpiece 50, so as to machine the material in the machining region, to make it softened rapidly, and the tool head 11 can still maintain a high hardness at this temperature without deformation, effectively improving the service life of the tool head 11.

In this embodiment, the heating ring 112 may be heated by the heating device 20, and the heating device 20 may be an inductive heating device, as the inductive heating does not need to be in direct contact with the stir body 111, so as to facilitate the rotation of the stir friction tool 10. The inductive heating device includes a heating portion 21 that is helically surrounded around the outside of the heating ring 112, and the surrounding setting enables the heating ring 112 to be uniformly heated as a whole.

Further, the solid-phase molding processing method also includes:

preventing the heat generated by the tool head 11 from being conducted upwardly; and cooling a middle part of the friction stir tool 10 to prevent the heat generated by the tool head 11 from being conducted upwards.

By preventing the heat generated by the tool head 11 from being conducted upwardly, it is possible to prevent excessive heat from being conducted to the upper part of the stir friction tool 10, which can affect the structural rigidity of the stir friction tool 10. Particularly when applied to solid-state additive manufacturing, an upper end of the friction stir tool 10 is connected to the spindle and the transmission device, and a lower end of the friction stir tool 10 is in contact with the coated coating and generates heat. At this time, by cooling the friction stir tool 10, on the one hand, it is possible to prevent the heat at the bottom of the friction stir tool 10 from being transmitted upward during the additive manufacturing process, which results in damage to the spindle at the upper end and reduces its rigidity, and on the other hand, it is also possible to prevent the consumable rod located in the upper part of the consumable rod channel 113 of the friction stir tool 10 from preventing the tool head 11 due to overheating and expanding, and it is possible to prevent the consumable bar from bending under the downward pressure of the top forging.

In some embodiments of the present application, the heat generated by the tool head 11 can be prevented from being transmitted upwardly by providing a heat dissipation groove 131 in the outer peripheral wall of the friction stir tool 10 and spraying coolant into the heat dissipation groove 131.

Figure 7:
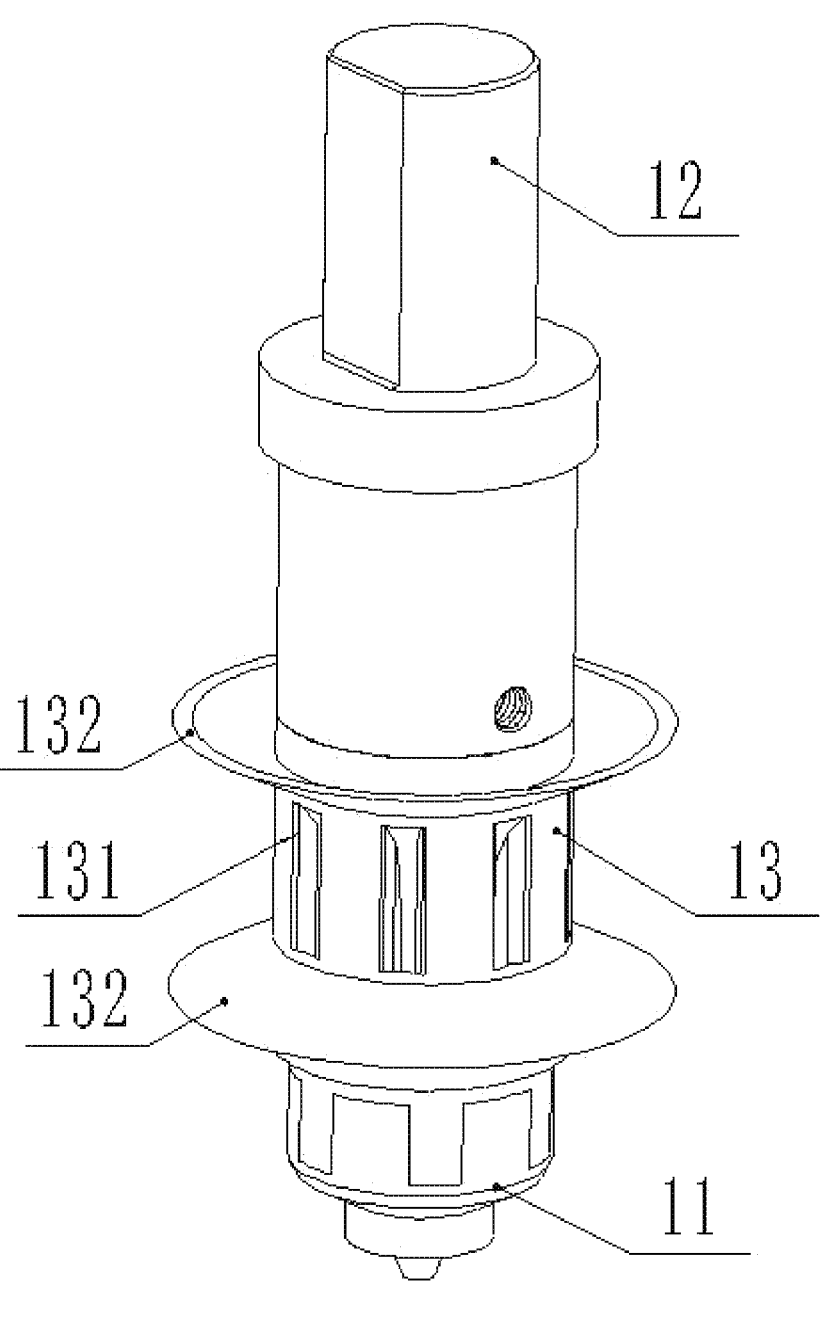
FIG. 7 is a schematic structural view of a friction stir tool of an embodiment of the present application (the sleeve and heating portion are removed).
Figure 8:
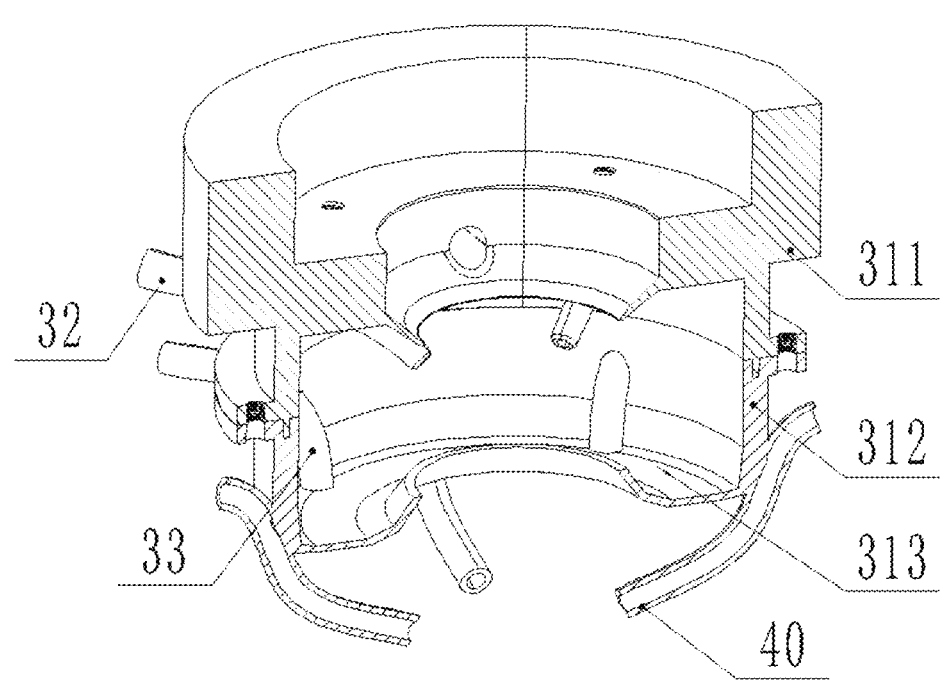
FIG. 8 is a sectional view of the sleeve in the friction stir tool of an embodiment of the present application.
Figure 9:
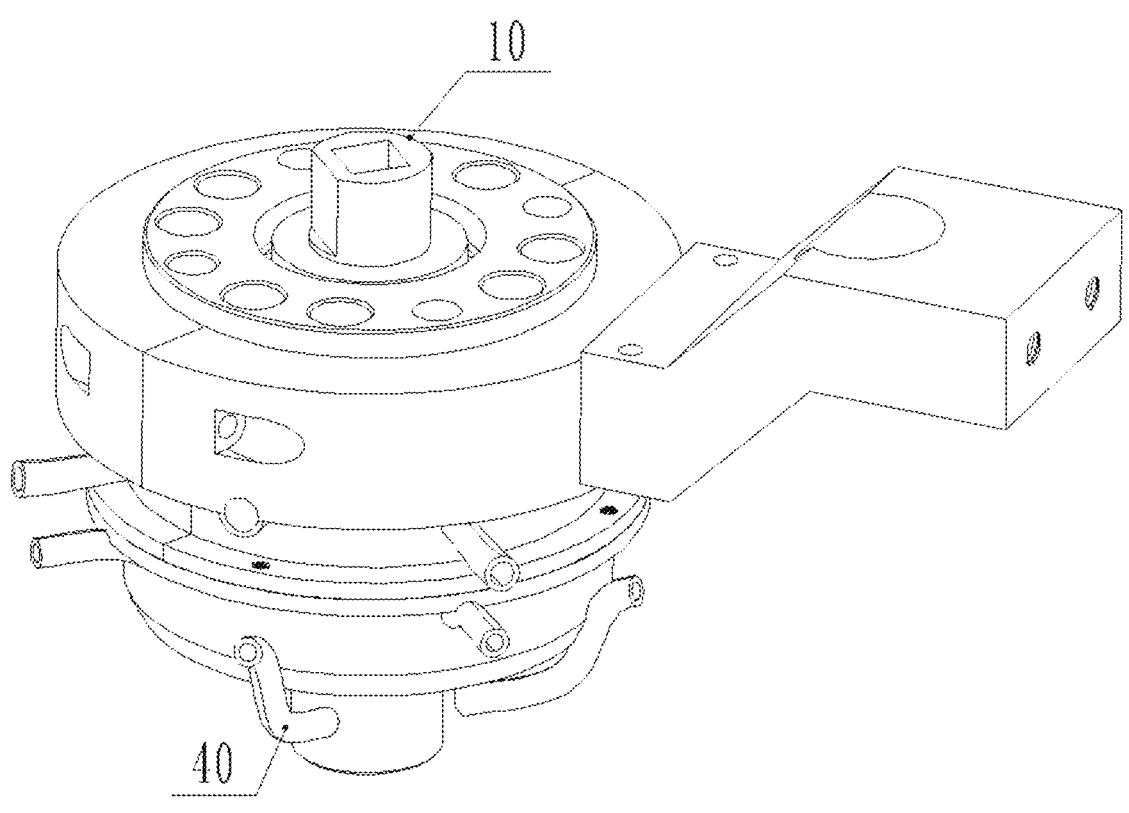
FIG. 9 is a schematic structural view of a friction stir tool of another embodiment of the present application.
Figure 10:
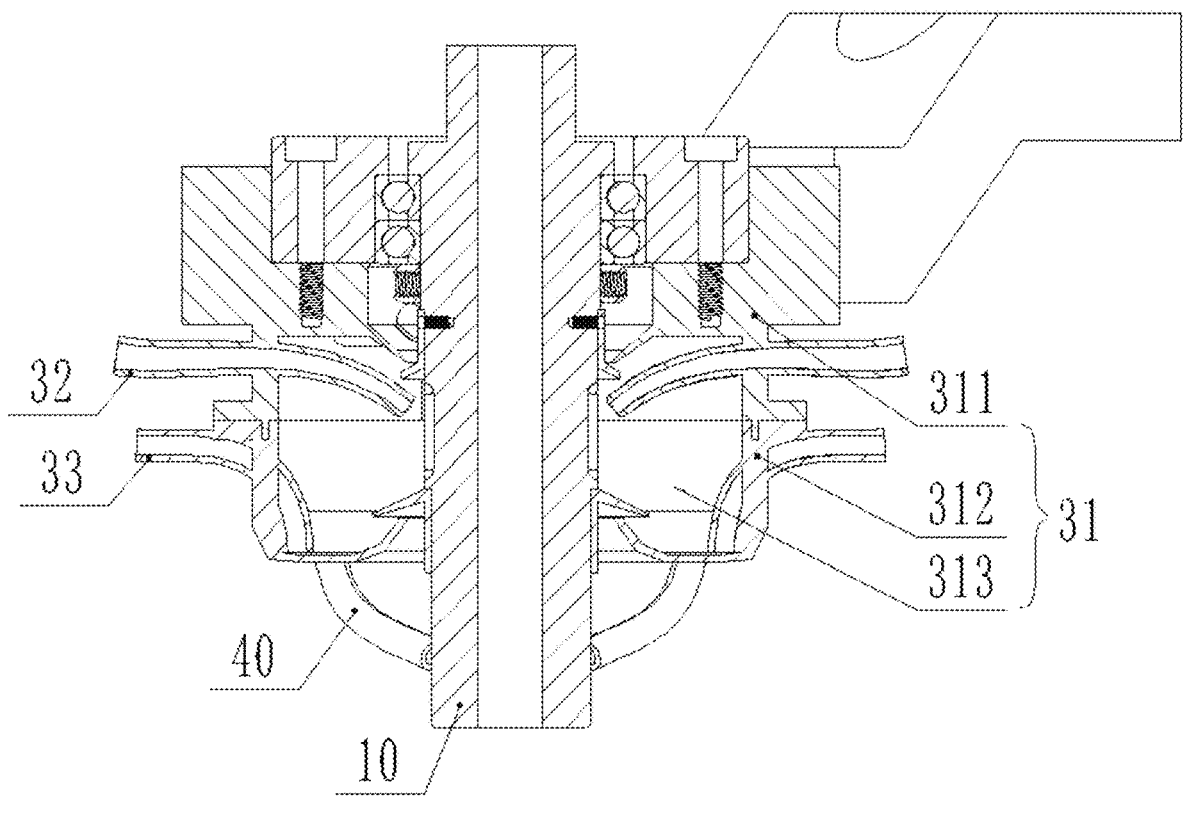
FIG. 10 is a sectional view of FIG. 9.
Figure 11:
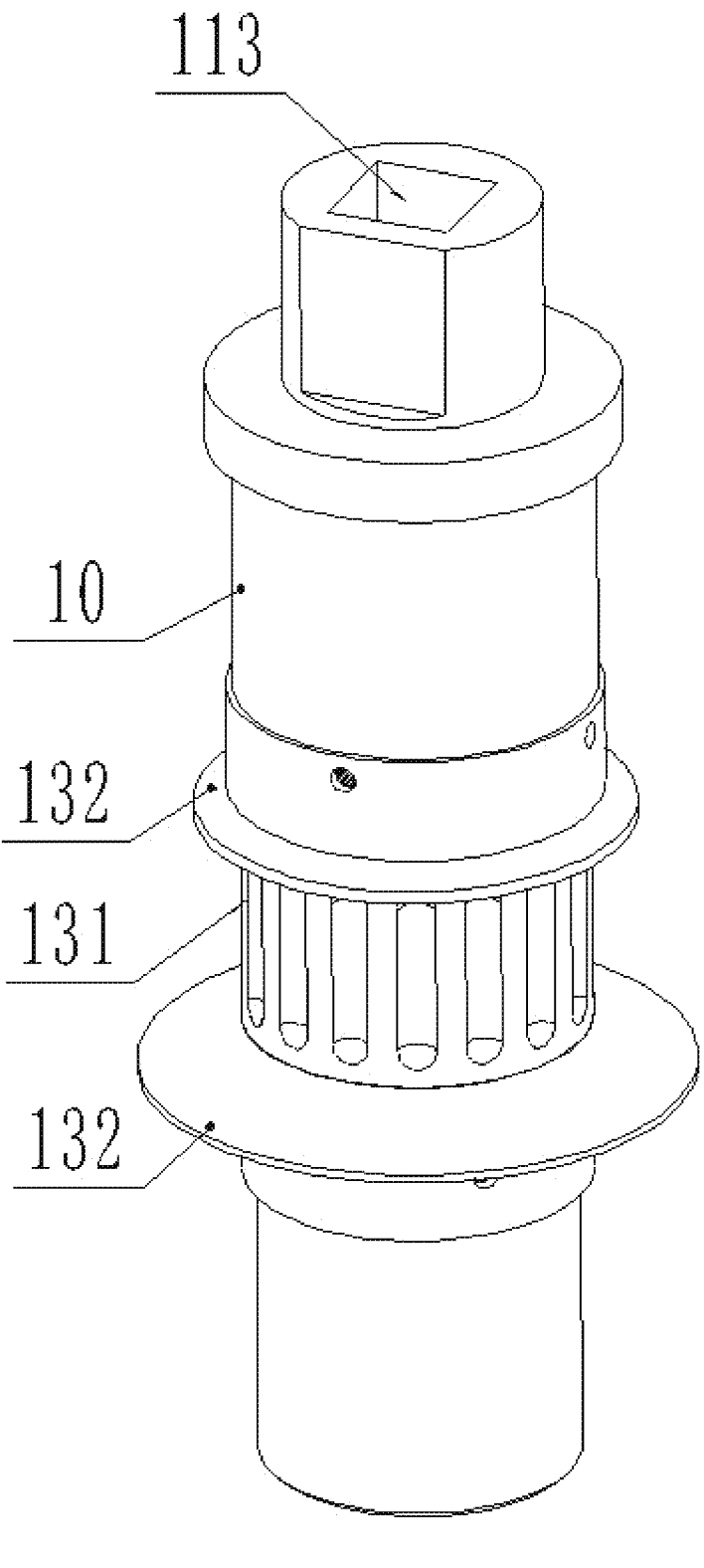
FIG. 11 is a schematic structural view of the friction stir tool of FIG. 9 (the sleeve and heating portion are removed).
Figure 12:
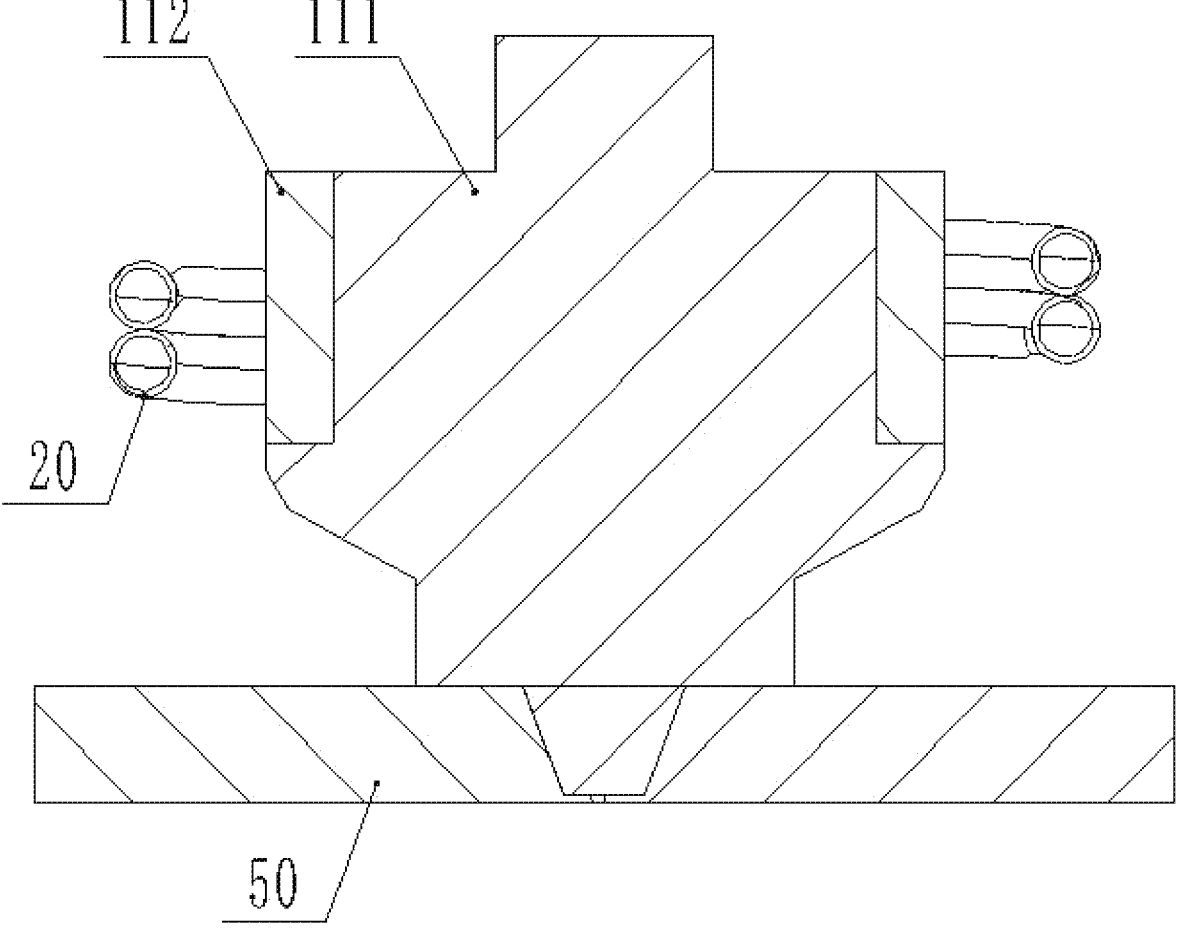
FIG. 12 is a diagram of a machining state of the friction stir tool of the embodiment of the present application (applied to the friction stir welding technology).

The heat dissipation groove 131 is located above the tool head 11. Specifically, as shown in FIG. 7, the friction stir tool 10 may include a mounting portion 12 and a connection portion 13 provided between the tool head 11 and the mounting portion 12. The mounting portion 12 is used for connecting with an external friction stir welding machine, and is driven by the machine to drive the tool head 11 and the connection portion 13 to rotate. The heat dissipation groove 131 is provided in the peripheral wall of the connection portion 13, and the heat dissipation groove 131 may be a spiral groove provided around the peripheral wall of the connection portion 13, and in some embodiments of the present application, the heat dissipation groove 131 includes vertical grooves provided in the axial direction of the connection portion 13, and there are at least two of the vertical grooves circumferentially spaced around the connection portion 13. By spraying a cooling medium into the heat dissipation groove 131, heat generated by the tool head 11 can be prevented from being transmitted to the upper mounting portion 12, which affects the structural rigidity of the stir friction tool 10. When the mounting portion 12 is driven to rotate by the external friction stir welding machine, the connection portion 13 rotates together with it, so that the coolant inside the heat dissipation groove 131 is thrown out to the outside of the heat dissipation groove 131 under the action of the rotating centrifugal force.

The tool head 11 and the mounting portion 12 and the connection portion 13 may be provided as a split structure. The tool head 11 may be made of a material with good thermal conductivity, the mounting portion 12 may be made of a general tool steel, and the connection portion 13 may be made of a tool steel, a high-speed steel, or a high-temperature alloy material, which not only ensures the thermal conductivity of the tool head 11, but also saves costs.

Further, the tool head 11, the mounting portion 12 and the connection portion 13 can be connected through a concave-convex structure and secured by bolts, so as to transmit torque between the tool head 11, the mounting portion 12 and the connection portion 13.

In some embodiments of the present application, the cooling nozzle 32 may be used to inject the coolant into the heat dissipation groove 131. The cooling nozzle 32 may be located outside of the stir friction tool 10 for injecting the coolant into the heat dissipation groove 131 to prevent the heat generated by the tool head 11 from being transmitted upwards.

Further, a sleeve 31 is provided outside of the friction stir tool, and a cavity 313 corresponding to the heat dissipation groove 131 is provided in the sleeve 31. The solid-phase processing method may further include:

Collect the coolant thrown out of the heat dissipation groove 131 into the cavity 313.

As shown in FIGS. 5 to 8, the sleeve 31 is located outside of the stir friction tool 10 and rotates relative to the friction stir tool 10. Sleeve 31 may include a first sleeve 311 and a second sleeve 312 that are disassembled, and two sleeves may be connected by a concave-convex structural fit, which can play a sealing role and prevent leakage of water. A bearing sleeve may be provided in the first sleeve 311, and a bearing rotationally connected to the mounting portion 12 is installed in the bearing sleeve to enable the friction stir tool 10 to rotate relative to the sleeve 31.

A cavity 313 corresponding to the connection portion 13 is provided in sleeve 31. The jet end of the cooling nozzle 32 may extend into the cavity 313 for jetting the coolant into the heat dissipation groove 131, so that when the stir friction tool 10 rotates at a high speed, the coolant in the heat dissipation groove 131 can be thrown into the cavity 313.

Since the cooling water sprayed into the heat dissipation groove 131 generates water vapor when it meets high temperatures, in some embodiments of the present application, the solid-phase processing method further includes:

expelling water vapor generated during the cooling of the friction stir tool 10 out of the cavity 313.

By discharging the water vapor out of the cavity 313, the pressure balance inside the cavity 313 can be maintained, preventing the water vapor from causing the pressure inside the cavity 313 to be too high, resulting in the coolant not being able to be ejected smoothly.

Specifically, an exhaust gap connected to the cavity 313 is formed between the sleeve 31 and the friction stir tool 10, i.e., a gap is left between the inner side wall of the sleeve 31 close to the friction stir tool 10 and the outside wall of the stir friction tool 10, and the exhaust gap may be provided at the upper and lower ends of the cavity 313, and the exhaust channel 314 connected to the exhaust gap is provided in the side wall of the sleeve 31, and water vapor is discharged to the outside of the cavity 313 through the exhaust channel 314 after passing through the exhaust gap. Water vapor is discharged out of cavity 313 through the exhaust channel 314 after passing through the exhaust gap.

In order to prevent the coolant in the cavity 313 from leaking to the surface of the welded product or the surface of the coating, in some embodiments of the present application, the friction stir tool 10 is provided with a water-blocking ring 132, which is located at the upper and lower ends of the cavity 313 to prevent the coolant thrown out of the heat dissipation groove 131 from leaking out of the exhaust gap.

As shown in FIG. 7, the water-blocking ring 132 can be extended radially along the connection portion 13, so that when the friction stir tool 10 rotates, the cooling water in the heat dissipation groove 131 is thrown onto the water-blocking ring 132 and thrown out by centrifugal force, and then falls to the bottom of the cavity 313 by gravity for collection, so as to prevent the coolant thrown out of the heat dissipation groove 131 from leaking out of the exhaust gap.

Specifically, two water-blocking rings 132 are provided, located at the upper and lower ends of the heat dissipation groove 131 respectively. The upper water-blocking ring 132 can be tilted upward from inside to outside, and the lower water-blocking ring 132 can be tilted downward from inside to outside, so as to be capable of guiding the coolant flung out of the heat dissipation groove 131 to enter into the cavity 313. The friction stir tool 10 is provided with the water-blocking ring 132, and the water-blocking ring 132 is located at the upper and lower ends of the cavity 313 to prevent the coolant thrown out of the heat dissipation groove 131 from leaking out of the exhaust gap.

Further, the sleeve 31 is provided with an exhaust device 33 extending into the cavity 313. The solid-phase processing method further includes:

discharging the coolant collected in the cavity 313 using the exhaust device 33.

The exhaust device 33 may be a drainpipe connected to the interior of the cavity 313, and when the coolant collected in the cavity 313 reaches a certain amount, the coolant may be pumped out through the drain pipe.

Further, the solid-phase molding processing method may further include:

obtaining a real-time temperature of the friction stir tool 10;

adjusting the heating temperature of the heating ring 112 and/or adjusting a flow rate of the coolant injected into the heat dissipation groove 131 based on the real-time temperature of the friction stir tool 10;

when the real-time temperature of the friction stir tool 10 is greater than the pre-set value, reducing the heating temperature of the heating ring 112 and/or increasing the flow rate of the coolant; and when the heating temperature of the friction stir tool 10 is less than the pre-set value, increasing the heating temperature of the heating ring 112 and/or reducing the flow rate of the coolant.

By obtaining the real-time temperature of the stir friction tool 10, it is convenient to accurately adjust the heating temperature of the heating ring 112 and control the flow rate of the coolant injected into the heat dissipation groove 131, so as to avoid the temperature of the stir friction tool 10 from being too high or too low, which may affect the machining effect of the workpiece.

Specifically, the friction stir tool 10 may include a detector for detecting the friction stir tool 10 and a controller for controlling the coolant flow. The detector may be a thermocouple or an infrared camera, and the controller may be connected to an inductive heating device and/or a cooling nozzle 32. When the detector obtains the real-time temperature of the friction stir tool 10 and sends it to the controller, the controller then adjusts the current of the inductive heating device and/or adjusts the flow rate of the cooling nozzle 32 in real-time based on the obtained temperature information, thereby achieving the purpose of real-time thermal input adjustment.

Further, the solid-phase molding processing method may also include:

spraying protective gas to the tool head 11 and/or the to-be-processed workpiece 50.

Specifically, a protective gas mechanism 40 may be provided at the lower end of the sleeve 31, and the protective gas may be injected into the machining region of the tool head 11 and/or the to-be-processed workpiece 50 through the protective gas mechanism 40 to prevent oxidization of the plastically deformed workpiece or the consumable rod.

The above shows and describes the basic principles and main features of the present application and the advantages of the present application. It should be understood by those skilled in the art that the present application is not limited by the above embodiments, and that the above embodiments and the description in the specification are only illustrative of the principles of the present application, and that there will be various variations and improvements of the present application without departing from the spirit and scope of the present application, which fall within the scope of the present application claimed to be protected. The scope of the claimed protection of the present application is defined by the appended claims and their equivalents.

What is claimed is:

1. A friction stir tool, comprising:

a stirring head, a mounting portion, and a connection portion provided between the stirring head and the mounting portion;

wherein the stirring head comprises a stirring main body and a heating ring provided on the stirring main body;

the heating ring is sleeved on an end of the stirring main body away from a shoulder and a welding pin, and is separated from the stirring main body;

the mounting portion is connected to an external friction stir welding machine, and is driven by the friction stir welding machine to drive the stirring head and the connection portion to rotate;

the heating ring is heated by an inductive heating device; and the inductive heating device comprises a heating part spirally wound on an outside of the heating ring;

a heat dissipation groove is provided on an outer peripheral wall of the connection portion;

wherein the heat dissipation groove comprises vertical grooves provided along an axial direction of the connection portion, and at least two vertical grooves are provided around the connection portion at intervals in a circumferential direction;

wherein a sleeve is sleeved on an outside of the friction stir tool, and a cavity corresponding to the heat dissipation groove is provided inside the sleeve, to collect cooling liquid thrown out of the heat dissipation groove into the cavity;

wherein the sleeve comprises a first sleeve and a second sleeve which are detachably connected;

a concave-convex structure fit is adopted at a joint of the first sleeve and the second sleeve;

a bearing sleeve is provided inside the first sleeve; and a bearing rotatably connected to the mounting portion is installed inside the bearing sleeve, so that the friction stir tool rotate relative to the sleeve.

2. The friction stir tool according to claim 1, wherein the heat dissipation groove is a spiral groove provided around the outer peripheral wall of the connection portion.

3. The friction stir tool according to claim 1, when the friction stir tool is applied to solid-state additive manufacturing technology, a rod material channel is provided inside the friction stir tool, and the rod material channel penetrates through two ends of the friction stir tool.

4. The friction stir tool according to claim 1, wherein an exhaust gap is connected to the cavity is formed between the sleeve and the friction stir tool, and an exhaust channel is connected to the exhaust gap is opened in a side wall of the sleeve, and the water vapor passes through the exhaust gap and then discharge through the exhaust channel.

5. The friction stir tool according to claim 4, wherein the friction stir tool is provided with a water-blocking ring, the water-blocking ring is located at an upper end and a lower end of the cavity, to prevent the coolant thrown out of the heat dissipation groove from leaking out of the exhaust gap.

6. The friction stir tool according to claim 5, wherein an upper water-blocking ring and a lower water-blocking ring are provided at upper and lower ends of the heat dissipation groove, respectively, the upper water-blocking ring is provided to slope upwards from inside to outside, and the lower water-blocking ring is provided to slope downwards from inside to outside, to guide the cooling liquid thrown out of the heat dissipation groove into the cavity.

7. The friction stir tool according to claim 1, wherein the heating ring is heated by an inductive heating device, wherein the inductive heating device comprises a heating portion in a spiral shape surrounding an outside of the heating ring.

8. A solid-phase molding processing method, applied with the friction stir tool of claim 1, comprising:

heating the heating ring to generate heat, where the heating ring is heated to a heating temperature T sufficient to soften a to-be-processed workpiece while remaining lower than the deformation temperature of the tool head;

wherein the heat generated by the heating ring is conducted downwardly through the stir body to a shaft shoulder and/or a welding pin of the tool head;

driving the friction stir tool to rotate causing the to-be-processed workpiece undergo deformation and generating friction heat;

converging the friction heat with the heat conducted to the shaft shoulder and/or the welding pin of the tool head to heat and soften the to-be-processed workpiece and to form a plastic deformation flow; and translating the friction stir tool to make the plastic deformation flow deposited behind the tool head to form a molding portion.

9. The solid-phase molding processing method according to claim 8, further comprising:

preventing the heat generated by the tool head from being conducted upwards; and cooling a middle part of the friction stir tool to prevent the heat generated by the tool head from being conducted upwards.

10. The solid-phase molding processing method according to claim 8, further comprising:

obtaining a real-time temperature of the friction stir tool;

adjusting a heating temperature of the heating ring and/or adjusting a flow rate of the coolant injected into the heat dissipation groove based on the real-time temperature of the friction stir tool;

when the real-time temperature of the friction stir tool is greater than the pre-set value, reducing the heating temperature of the heating ring and/or increasing a flow rate of the coolant; and when the real-time temperature of the stir friction tool is less than the pre-set value, increasing the heating temperature of the heating ring and/or reducing the flow rate of the coolant.

11. The solid-phase molding processing method according to claim 8, wherein the solid-phase molding processing method is applied to a friction stir welding technology, the specific method of driving the friction stir tool to rotate to deform the to-be-processed workpiece to generate friction heat comprises:

driving the friction stir tool to rotate and plunge the tool head to be down to the weld joint of the to-be-processed workpiece; and rotating the tool head relative to the to-be-processed workpiece to deform the workpiece and to generate the friction heat.

* * * * *